United States Patent
Bhattacharjee

(10) Patent No.: US 10,409,779 B2
(45) Date of Patent: Sep. 10, 2019

(54) DOCUMENT SHARING VIA LOGICAL TAGGING

(71) Applicant: Microsoft Technology Licensing, LLC., Redmond, WA (US)

(72) Inventor: Kankan Bhattacharjee, Hyderabad (IN)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 254 days.

(21) Appl. No.: 15/253,712

(22) Filed: Aug. 31, 2016

(65) Prior Publication Data

US 2018/0060347 A1 Mar. 1, 2018

(51) Int. Cl.
| G06F 17/30 | (2006.01) |
| --- | --- |
| G06F 16/176 | (2019.01) |
| G06F 16/14 | (2019.01) |
| G06F 16/16 | (2019.01) |
| G06F 16/188 | (2019.01) |
| G06F 16/951 | (2019.01) |
| G06F 16/35 | (2019.01) |

(52) U.S. Cl.
CPC ......... *G06F 16/176* (2019.01); *G06F 16/148* (2019.01); *G06F 16/156* (2019.01); *G06F 16/164* (2019.01); *G06F 16/192* (2019.01); *G06F 16/35* (2019.01); *G06F 16/951* (2019.01)

(58) Field of Classification Search
None
See application file for complete search history.

(56) References Cited

U.S. PATENT DOCUMENTS

| 4,899,299 A | 2/1990 | MacPhail |
| --- | --- | --- |
| 5,813,009 A | 9/1998 | Johnson et al. |

(Continued)

FOREIGN PATENT DOCUMENTS

| EP | 1411736 A1 | 4/2004 |
| --- | --- | --- |
| WO | 2007076715 A1 | 7/2007 |
| WO | 2010074655 A1 | 7/2010 |

OTHER PUBLICATIONS

"International Search Report and Written Opinion Issued in PCT Application No. PCT/US2017/048516", dated Jan. 3, 2018, 16 Pages.

(Continued)

*Primary Examiner* — Debbie M Le
(74) *Attorney, Agent, or Firm* — Merchant & Gould

(57) ABSTRACT

Efficient sharing of documents via logical tagging is provided. A document tagging system allows a user to tag a document with a label that is associated with a virtual folder of documents in an online document system, and to provide one or more users with access to the virtual folder. Providing access to the virtual folder associated with the label provides access to the document and other documents tagged with the label. The document and other documents tagged with the label can be shared with other users without attaching documents to emails or creating duplicate copies of the documents. A user interface element is provided for allowing the user to enter or select one or more labels with which to tag a document. Various documents can be associated with a label regardless of the document type. Further, the documents may be stored across various repositories.

20 Claims, 10 Drawing Sheets

(56) References Cited

U.S. PATENT DOCUMENTS

| | | |
|---|---|---|
| 5,831,611 A | 11/1998 | Kennedy et al. |
| 5,966,663 A | 10/1999 | Gleason |
| 6,029,192 A | 2/2000 | Hill et al. |
| 6,088,720 A | 7/2000 | Berkowitz et al. |
| 6,115,455 A | 9/2000 | Picard |
| 6,137,864 A | 10/2000 | Yaker |
| 7,062,532 B1 | 6/2006 | Sweat et al. |
| 7,107,298 B2 | 9/2006 | Prahlad et al. |
| 7,107,416 B2 | 9/2006 | Stuart et al. |
| 7,162,512 B1 | 1/2007 | Amit et al. |
| 7,191,219 B2 | 3/2007 | Udell et al. |
| 7,594,082 B1 | 9/2009 | Kilday et al. |
| 7,703,040 B2* | 4/2010 | Cutrell .............. G06F 16/90335 715/792 |
| 7,757,270 B2* | 7/2010 | Blumenau ......... G06F 17/30997 726/1 |
| 8,126,854 B1 | 2/2012 | Sreedharan |
| 8,332,440 B2 | 12/2012 | Parker et al. |
| 8,533,232 B1* | 9/2013 | Hartman ............... G06F 3/0482 707/794 |
| 8,620,869 B2 | 12/2013 | Consul et al. |
| 8,805,785 B2* | 8/2014 | Vasudevan .............. G06F 16/93 707/638 |
| 8,831,951 B2 | 9/2014 | Cohen |
| 8,918,717 B2* | 12/2014 | Brooks .................. G06Q 10/10 707/771 |
| 8,930,849 B2* | 1/2015 | Roberts ................ G11B 27/034 715/810 |
| 9,197,668 B2* | 11/2015 | Boucher ............. G06F 21/6218 |
| 9,269,053 B2* | 2/2016 | Naslund ................. G06N 20/00 |
| 9,374,359 B2* | 6/2016 | McCann ................ G06F 21/41 |
| 9,588,644 B2* | 3/2017 | McCann ............... G06F 3/0482 |
| 9,824,159 B2* | 11/2017 | McCann ............... G06F 16/901 |
| 9,977,938 B2* | 5/2018 | Rathus ................ G06K 7/10009 |
| 2002/0019827 A1 | 2/2002 | Shiman et al. |
| 2002/0027567 A1 | 3/2002 | Niamir et al. |
| 2002/0120697 A1 | 8/2002 | Generous et al. |
| 2002/0143885 A1 | 10/2002 | Ross, Jr. |
| 2002/0156784 A1 | 10/2002 | Hanes et al. |
| 2003/0126215 A1 | 7/2003 | Udell et al. |
| 2003/0187938 A1 | 10/2003 | Mousseau et al. |
| 2004/0243676 A1 | 12/2004 | Blankenship |
| 2005/0055519 A1 | 3/2005 | Stuart et al. |
| 2005/0071435 A1 | 3/2005 | Karstens |
| 2005/0132010 A1 | 6/2005 | Muller |
| 2005/0160227 A1 | 7/2005 | Todd et al. |
| 2005/0165734 A1 | 7/2005 | Vicars et al. |
| 2005/0216745 A1 | 9/2005 | Speare et al. |
| 2006/0036946 A1 | 2/2006 | Radtke et al. |
| 2006/0069604 A1 | 3/2006 | Leukart et al. |
| 2006/0080303 A1 | 4/2006 | Sargent et al. |
| 2006/0156382 A1 | 7/2006 | Motoyama |
| 2006/0195465 A1 | 8/2006 | Atchison et al. |
| 2006/0206566 A1 | 9/2006 | Kelley et al. |
| 2006/0218198 A1 | 9/2006 | Brown et al. |
| 2006/0271784 A1 | 11/2006 | Bolosky et al. |
| 2006/0282630 A1 | 12/2006 | Hochberg et al. |
| 2007/0100950 A1 | 5/2007 | Bornstein et al. |
| 2007/0195081 A1 | 8/2007 | Fischer |
| 2007/0244892 A1 | 10/2007 | Narancic |
| 2007/0271308 A1 | 11/2007 | Bentley et al. |
| 2008/0005204 A1 | 1/2008 | Prus et al. |
| 2008/0016575 A1 | 1/2008 | Vincent et al. |
| 2008/0109448 A1 | 5/2008 | Aboel-Nil et al. |
| 2008/0133486 A1 | 6/2008 | Fitzgerald et al. |
| 2008/0183674 A1 | 7/2008 | Bush et al. |
| 2009/0177704 A1 | 7/2009 | Consul et al. |
| 2009/0276455 A1 | 11/2009 | Yu et al. |
| 2010/0094809 A1 | 4/2010 | Consul et al. |
| 2010/0161631 A1 | 6/2010 | Yu et al. |
| 2011/0093471 A1 | 4/2011 | Brockway et al. |
| 2012/0304247 A1* | 11/2012 | Badger ............... G06F 21/6218 726/1 |
| 2012/0324002 A1* | 12/2012 | Chen ................. G06F 17/30274 709/204 |
| 2013/0013716 A1 | 1/2013 | Buchheit et al. |
| 2013/0234813 A1* | 9/2013 | Imamura ................. H01H 1/66 335/201 |
| 2013/0262420 A1* | 10/2013 | Edelstein .......... G06F 17/30309 707/695 |
| 2014/0095641 A1 | 4/2014 | Consul et al. |
| 2015/0248405 A1* | 9/2015 | Rudich .............. G06Q 10/0631 707/608 |
| 2016/0162591 A1* | 6/2016 | Dokania ................ G06F 3/0482 707/738 |
| 2016/0350421 A1* | 12/2016 | Multerer ........... G06F 17/30864 |
| 2017/0026333 A1* | 1/2017 | Pitroda ................... H04L 51/14 |

OTHER PUBLICATIONS

"Configure Retention Settings and AutoArchive in Outlook 2007", Retrieved From: <<http://technet.microsoft.com/en-us/library/cc179124(printer).aspx>>, Apr. 28, 2008, pp. 1-4.

"Meeting the E-Mail Compliance Challenge with Microsoft Exchange Server 2007 Compliance Requirements for E-Mail and Messaging", In White Paper, Oct. 2006, 21 Pages.

"Policy for Messaging Services for Government of India", Retrieved From: <<https://mail.nic.in/docs/Messaging_Policy_for_NICNET.pdf>>, Aug. 2007, pp. 1-10.

"Advisory Action Issued in U.S. Appl. No. 11/971,895,", dated Dec. 7, 2010, 3 Pages.

"Amendment and Response Issued in U.S. Appl. No. 11/971,895", dated Apr. 6, 2012, 18 Pages.

"Amendment and Response Issued in U.S. Appl. No. 11/971,895,", dated Sep. 24, 2011, 32 Pages.

"Amendment and Response Issued in U.S. Appl. No. 11/971,895,", dated Jul. 19, 2010, 14 Pages.

"Amendment and Response Issued in U.S. Appl. No. 11/971,895,", dated Apr. 16, 2011, 23 Pages.

"Amendment and Response Issued in U.S. Appl. No. 11/971,895,", dated Dec. 15, 2010, 2 Pages.

"Amendment and Response Issued in U.S. Appl. No. 11/971,895,", dated Nov. 28, 2010, 23 Pages.

"Final Office Action Issued in U.S. Appl. No. 11/971,895", dated Sep. 27, 2010, 24 Pages.

"Final Office Action Issued in U.S. Appl. No. 11/971,895", dated Dec. 6, 2011, 29 Pages.

"Non-final Office Action Issued in U.S. Appl. No. 11/971,895", dated Sep. 4, 2012, 22 Pages.

"Non-final Office Action Issued in U.S. Appl. No. 11/971,895", dated Jun. 24, 2011, 22 Pages.

"Non-final Office Action Issued in U.S. Appl. No. 11/971,895", dated Mar. 22, 2010, 19 Pages.

"Non-final Office Action Issued in U.S. Appl. No. 11/971,895", dated Feb. 3, 2011, 19 Pages.

"Amendment and Response Issued in U.S. Appl. No. 12/237,940", dated Aug. 7, 2012, 15 Pages.

"Amendment and Response Issued in U.S. Appl. No. 12/237,940", dated Aug. 5, 2013, 14 Pages.

"Amendment and Response Issued in U.S. Appl. No. 12/237,940", dated Jul. 28, 2011, 15 Pages.

"Amendment and Response Issued in U.S. Appl. No. 12/237,940", dated Apr. 25, 2013, 16 Pages.

"Amendment and Response Issued in U.S. Appl. No. 12/237,940", dated Nov. 16, 2012, 15 Pages.

"Amendment and Response Issued in U.S. Appl. No. 12/237,940", dated Jan. 11, 2012, 14 Pages.

"Amendment and Response Issued in U.S. Appl. No. 12/237,940", dated Apr. 30, 2012, 14 Pages.

"Final Office Action Issued in U.S. Appl. No. 12/237,940", dated Jan. 25, 2013, 19 Pages.

"Final Office Action Issued in U.S. Appl. No. 12/237,940", dated May 7, 2012, 15 Pages.

"Final Office Action Issued in U.S. Appl. No. 12/237,940", dated Oct. 11, 2011, 13 Pages.

(56) References Cited

OTHER PUBLICATIONS

"Non-final Office Action Issued in U.S. Appl. No. 12/237,940", dated Jan. 31, 2012, 15 Pages.
"Non-final Office Action Issued in U.S. Appl. No. 12/237,940", dated Apr. 28, 2011, 13 Pages.
"Non-final Office Action Issued in U.S. Appl. No. 12/237,940", dated Aug. 16, 2012, 15 Pages.
"Non-final Office Action Issued in U.S. Appl. No. 12/237,940", dated May 3, 2013, 18 Pages.
"Notice of Allowance Issued in U.S. Appl. No. 12/237,940", dated Aug. 29, 2013, 11 Pages.
"Final Office Action Issued in U.S. Appl. No. 14/100,153", dated Aug. 10, 2015, 13 Pages.
"Final Office Action Issued in U.S. Appl. No. 14/100,153", dated Jan. 15, 2015, 13 Pages.
"Final Office Action Issued in U.S. Appl. No. 14/100,153", dated Apr. 7, 2016, 13 Pages.
"Final Office Action Issued in U.S. Appl. No. 14/100,153", dated Sep. 6, 2017, 19 Pages.
"Final Office Action Issued in U.S. Appl. No. 14/100,153", dated Dec. 15, 2016, 17 Pages.
"Non Final Office Action Issued in U.S. Appl. No. 14/100,153", dated Feb. 26, 2018, 21 Pages.
"Non-final Office Action Issued in U.S. Appl. No. 14/100,153", dated Mar. 23, 2017, 17 Pages.
"Non-final Office Action Issued in U.S. Appl. No. 14/100,153", dated Jul. 28, 2016, 14 Pages.
"Non-final Office Action Issued in U.S. Appl. No. 14/100,153", dated Apr. 24, 2015, 13 Pages.
"Non-final Office Action Issued in U.S. Appl. No. 14/100,153", dated Nov. 19, 2015, 12 Pages.
"Non-final Office Action Issued in U.S. Appl. No. 14/100,153", dated Sep. 24, 2014 ,13 Pages.

Gellens, et al., "POP3 Extension Mechanism", Retrieved From: <<http://www.rfc-editor.org/rfc/rfc2449.txt>>, Nov. 1998, 16 Pages.
Gilliland, Art, "E-Mail Archives: Keys to Message Classification and Retention", Retrieved From: <<http://www.esj.com/enterprise/print.aspx?editorialsId=2725>>, Jul. 24, 2007, pp. 1-3.
"Applying Labels", Published on: Feb. 6, 2013 Available at: https://www.zoho.com/mail/help/applying-labels.html.
"Learning About Email Labels & Starred Messages", Retrieved on: Feb. 20, 2016 Available at http://www.lacesmagnetschool.org/academics/computer/pdf/Using_Labels_and_Stars.pdf.
Eklund, Emil A, "New ways to label with "Move to" and autocomplete", Published on: Feb. 3, 2009 Available at: http://gmailblog.blogspot.in/2009/02/new-ways-to-label-with-move-to-and-auto.html.
"Label emails in Inbox", Retrieved on: Feb. 20, 2016 Available at: https://support.google.com/inbox/answer/6067566?hl=en.
MacBeth, Melissa, "Best practices for Outlook 2010", Published on: Feb. 23, 2015 Available at: https://support.office.com/en-us/article/Best-practices-for-Outlook-2010-f90e5f69-8832-4d89-95b3-bfdf76c82ef8.
"Outlook Categories: Why and How", Published on: Oct. 27, 2014 Avaliable at: http://new.office-watch.com/2014/outlook-categories-why-and-how/.
"OWA Searching and Sorting", Published on: Oct. 19, 2014 Available at: https://it.vanderbilt.edu/services/messaging/email/owa/search-and-sort.php.
Stych, Joe, "A Guide to Optimizing Gmail: 30 of the Best Tips, Tricks, Hacks and Add-Ons", Published on: Sep. 30, 2014 Available at: https://zapier.com/blog/organize-search-automate-gmail-inbox/.
"Search and EWS in Exchange", Published on: Sep. 3, 2014 Available at: https://msdn.microsoft.com/en-us/library/office/dn579421(v=exchg.150).aspx.
"Create a Search Folder", Published on: May 20, 2015 Available at: https://support.office.com/en-us/article/Create-a-Search-Folder-c1807038-01e4-475e-8869-0ccab0a56dc5.

* cited by examiner

DOCUMENT SHARING VIA LOGICAL TAGGING

BACKGROUND

In enterprise and in personal environments, entities oftentimes share or collaborate on documents with other entities. One typical method of sharing a document with another entity is attaching a copy of the document to an email, and sending the document copy to the other entity, which creates multiple copies of the same document. As can be appreciated, having multiple copies of a document takes up extra network resources, requires excessive amounts of storage, and creates a scenario in which entities may not have or be working on a same version of a document.

Other typical methods of sharing a document with another entity involve storing the document in an online document system and sending a link to the document to the entity, or manually selecting with whom the user would like to share the document, and further selecting what permissions to assign the user. The user may have to repeat these steps for each document that he/she wants to share. As can be appreciated, this can be an inefficient process.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for efficient sharing of documents via logical tagging. For example, a document tagging system is provided that allows users to tag a document with a label that is associated with a collection of documents in an online document system, and to provide one or more users with access to the collection, wherein providing access to the collection associated with the label provides access to the document and other documents tagged with the label. Examples enable tagging of various types of documents (e.g., emails, productivity application documents, web pages, drawings) under a single label.

Users are enabled to share documents with others by sharing the label instead of sharing physical documents as email attachments or file transfers. The document system is made more efficient by reducing an amount of data stored and transmitted. For example, duplicate copies of documents are reduced. Further, by eliminating or reducing a number of documents that are attached to emails, other application storage, such as email application storage, is reduced. Aspects provide for enhancing the collaboration process by simplifying the method of sharing documents. As can be appreciated, the efficiency of a computing device is improved by storing a single copy of resources, and provided resources to users via sharing of tags rather than sharing physical documents.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
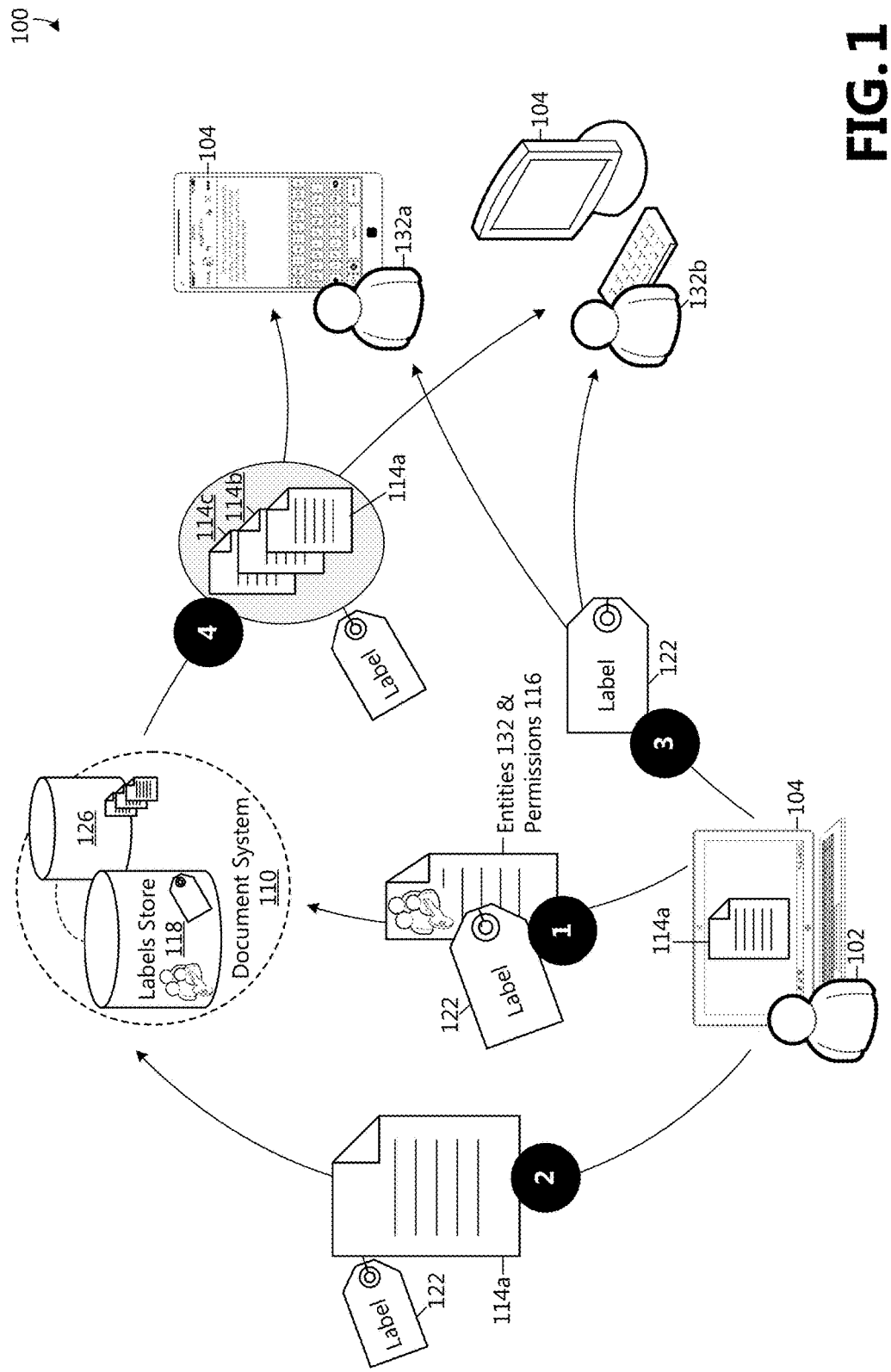
FIG. 1 is a data flow diagram showing one example of efficient sharing of documents via logical tagging.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing efficient sharing of documents via logical tagging. With reference now to FIG. 1, a data flow diagram 100 is provided that illustrates an example flow of data in an example logical tagging system for efficient sharing of documents via logical tagging. In one example and as illustrated, the flow of data starts when a user 102 creates a label 122 for associating with one or more content items. According to aspects, the label 122 is an identifier that may include one or a combination of: a keyword, a term, numeric characters, alphabetic characters, separators, or special characters. When creating the label 122, or at a later time, the user 102 selects one or more entities 132*a-n* (collectively, 132) to associate with the label. For example, associating entities 132 with a label 122 creates a membership list for the label, wherein the entities who are included in the membership list are provided with certain permissions for interacting with documents tagged with the label.

According to an aspect, when creating the label 122, or at a later time, the user 102 is enabled to select user access permissions 116 for entities 132. In some examples, the user 102 may select certain user access permissions 116 for all entities 132 associated with the label 122. In other examples, the user 102 may select certain user access permissions 116 for select entities 132 of the membership list. In one example, user access permissions 116 associated with a label 122 allow or prevent an entity 132 from tagging documents 114 with the label. In another example, user access permissions 116 associated with a label 122 indicate the extent to which an entity 132 may edit documents 114 tagged with the label.

Example user access permissions 116 include one or more of: full control, read/write, review only, comment only, read only, and no access. Other user access permissions 116 may be possible. According to an example, when an entity 132 is assigned full control in association with a label 122, the entity has full read/write access to documents 114 tagged with the label, and is allowed to change the formatting of the documents. When an entity 132 has read/write control in association with a label 122, the entity has read-write permission to documents 114 tagged with the label, but cannot make formatting changes. With review only permission in association with a label 122, an entity 132 can make changes to documents 114 that are tagged with the label, wherein the changes may be tracked via a track changes technology. With comment only permission in association with a label 122, an entity 132 can insert comments into a document 114 tagged with the label, but cannot alter content of the document. With read only permission in association with a label 122, an entity 132 can view documents 114 that are tagged with the label, but cannot make any changes to the documents, nor insert any comments.

As illustrated in FIG. 1, Step 1 in the example data flow diagram 100 includes communicating the label 122, associated entities 132, and user access permissions 116 with a document system 110, where they are stored in a labels store 118. As should be appreciated, the label 122, associated entities 132, and user access permissions 116 may be sent to the document system 110 in a single communication or in multiple communications. In some examples, creation of a label 122 and communication of the label, associated entities 132, and user access permissions 116 occurs later, such as when a document 114 is tagged with a label.

Continuing with the flow of data illustrated in FIG. 1, the user 102 or a permitted entity 132 views, authors, or edits a document 114a, and tags the document with a label 122. The user 102 or permitted entity 132 may utilize an application executing on a client computing device 104 to view, author, or edit the document 114a. The document 114a may be one of various types of resources, such as productivity application documents, emails, drawings, video files, audio files, images, etc. According to an aspect, various types of resources can be tagged with a particular label 122. For example, a single label 122 may be used to tag an email, a word processing document, a spreadsheet document, and a video file. According to some examples and as will be described in further detail below, a user interface element is provided for enabling the user 102 or a permitted entity to enter a label 122 or to select an existing label to associate with a document 114.

Step 2 in the example data flow diagram 100 includes uploading the tagged document 114a or changes made to the tagged document to the document system 110, which is operative to provide document storage and/or editing of documents. According to an aspect, the document system 110 comprises a local or remote storage repository 126 at which the one or more electronic documents 114a-n (collectively, 114) are stored. Documents 114 may be saved across a plurality of storage repositories.

The flow of data continues with Step 3 in the example data flow diagram 100 when the label 122 is shared with one or more other entities. Sharing the label 122 can occur prior to tagging a document 114 with the label 122. For example, the label 122 may be communicated with an entity 132 when the entity is associated with the label 122. In some examples, the label 122 is shared in an electronic communication, such as email message, a text message, and instant message, etc. By sharing the label 122 with an entity, the entity is enabled to access documents 114 associated with the label according to the entity's permissions 116.

The flow of data continues when an entity 132 selects a label 122, and accesses a collection of documents 114 to which the selected label points. Further, the entity 132 selects one or more documents 114 within the collection, and if the entity is permitted to access the document according to user access permissions 116, at Step 4 in the example data flow diagram 100, the one or more documents 114 are retrieved from the storage repository 126. As can be appreciated, by enabling users to tag various documents 114 with a label 122 and enabling entities 132 to access tagged documents according to each entity's user access permissions 116 associated with the label, an amount of data stored is reduced and the process of sharing and collaborating on documents is simplified. For example, users 102 are enabled to simply share the label 122 with entities, rather than sending documents 114 as email attachments or as file transfers, where multiple copies of a same document are created and stored. That is, logically grouping various documents 114 via tagging the documents with one or more labels 122 has a low impact on disk space and reduces duplication of saved documents.

Figure 2:
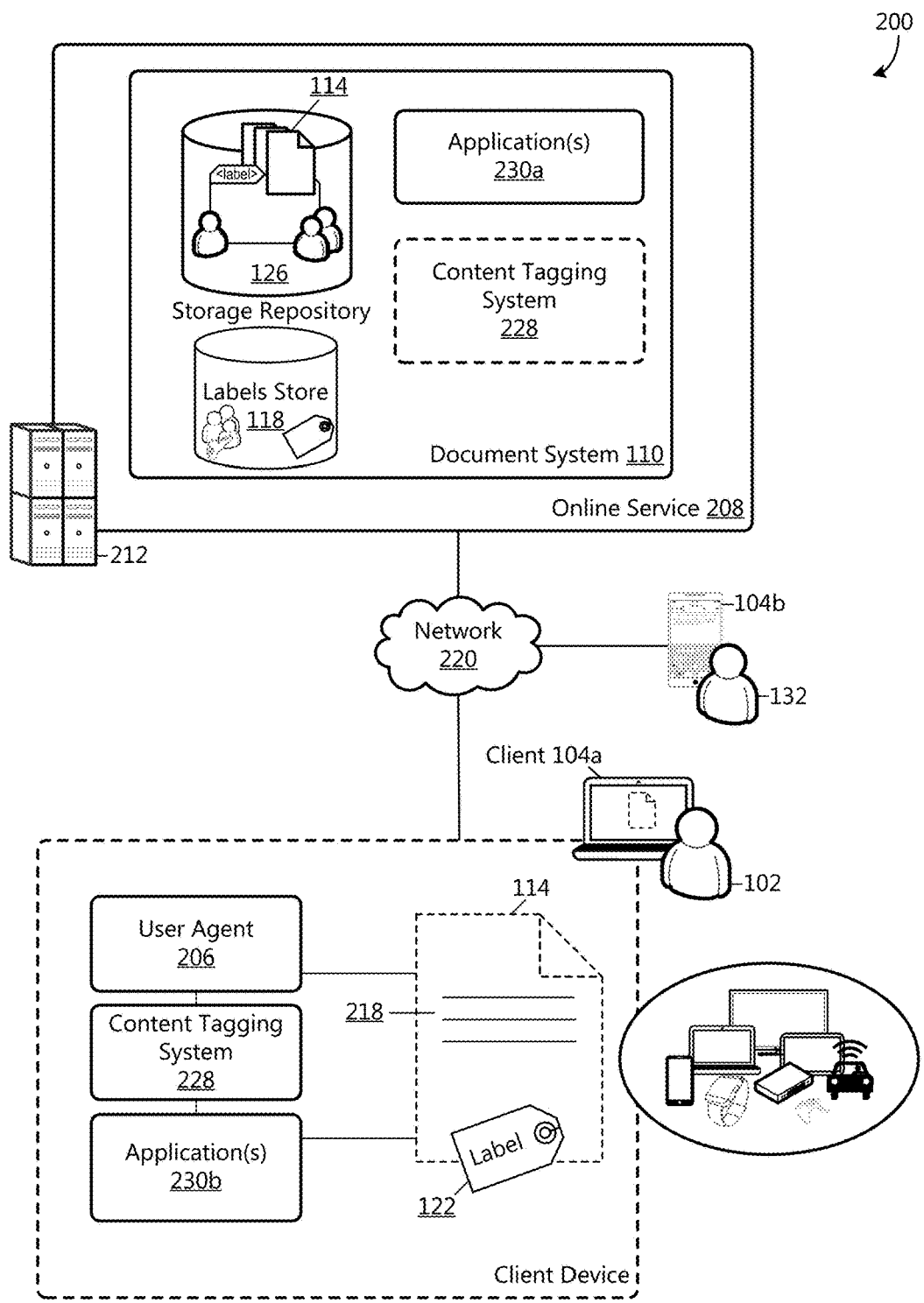
FIG. 2 is a block diagram showing components of an example system for providing efficient sharing of documents via logical tagging.

With reference now to FIG. 2, a block diagram illustrating aspects of an example system 200 for providing efficient sharing of documents via logical tagging is shown. In some examples, the system 200 includes an online service 208, illustrative of portal-based computing system for creating, managing and sharing electronic documents 114. In some examples, the online service 208 is located on a server 212, such as a shared resources server located at an enterprise accessible by various client computing devices 104. In other examples, the server 212 is a shared resources server remotely located from the various client computing devices 104. According to an aspect, the online service 208 includes the document system 110 operative to provide document storage and/or editing of documents 114. In one example, the document system 110 provides one or more online applications 230a to view, generate, and edit electronic documents 114. According to an aspect, the document system 110 comprises at least one local or remote storage repository 126 at which the one or more electronic documents 114 are stored. In some examples, the at least one storage repository 126 is operative to store documents 114 that are accessible to authorized entities who are within a same enterprise as the user 102, and is further operative to store documents that are accessible to authorized entities who are external to the enterprise. Electronic documents 114 stored in the storage repository 126 may be tagged with one or more labels 122 associated with various types of user access permissions 116.

The user 102 and the one or more entities 132 are enabled to access the server 212 and the electronic documents 114 from a variety of client computing devices 104 via a network 220 or combination of networks, such as, but not limited to, the Internet, wide area networks, local area networks, and combinations thereof. Examples of suitable client devices 104 include, but are not limited to, desktop computers, laptop computers, tablet computers, laptop/tablet hybrid computing devices, large screen multi-touch displays, mobile phones, personal digital assistants, wearable devices, gaming devices, connected automobiles, and smart appliances. The hardware of these computing devices is discussed in greater detail in regard to FIGS. 5, 6A, 6B, and 7.

The system 200 includes one or more applications 230a,b (collectively, 230) used to view, generate, and edit electronic documents 114. Examples of suitable applications 230 include, but are not limited to, word processing, spreadsheet, database, slide presentation, electronic mail, drawing, note taking, web browser, media player, and game applications. In some examples, the application(s) 230 are web applications 230a run on a server 212 and provided via an online service 208 as described above. According to an aspect, web applications communicate via the network 220 with a user agent 206, such as a browser, executing on a client computing device 104. The user agent 206 provides a user interface that allows a user 102 to interact with application content and electronic documents 114 stored in the storage repository 126. The user interface is displayed on a display of the client device 104 running the user agent 206. In some examples, the user agent 206 is a dedicated client application that provides a user interface and access to electronic documents 114 stored in the storage repository 126. In other examples, the application(s) 230 are local applications 230b stored and executed on the client device 104, and provide a user interface that allows a user 102 to interact with application content and electronic documents 114 stored in the storage repository 126.

A user 102 may use an application 230 to create a new document 114 or to edit an existing document 114. In examples, the application 230 receives input from the user, such as text input, drawing input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. In some examples, the user input results in content 218 being added to the document 114. In other examples, the user input results in a selection or entry of at least one label 122 to associate with a document 114.

The system 200 further includes a content tagging system 228 communicatively attached to the application 230. In some examples, the content tagging system 228 is stored and executed locally on the client computing device 104. In other examples, the content tagging system 228 is stored and executed remotely on a server 212. In some examples, the computing device 104 includes a content tagging application programming interface (API), operative to enable the application 230 to employ content tagging via stored instructions. The content tagging system 228 is illustrative of a software module, system, or device operative to receive input corresponding to a label 122, tagging selected documents 114 with one or more labels, logically grouping documents tagged with a label, managing user access permissions 116 associated with a label, and providing access to the grouping of documents tagged with the label to authorized entities 132.

According to an aspect, a selection or entry of a label 122 to associate with the document 114 tags the document with the label. For example, tagging a document 114 with a label 122 associates the document with other documents tagged with the same label, and provides access to the document to one or more entities 132 who are associated with the label according to user access permissions 116. In some examples, user access permissions 116 include default permissions that are automatically applied with the user 102 associates an entity 132 with a label 122. In other examples, the user 102 selects specific user access permissions 116 to apply to an entity 132 or a group of entities associated with a label 122. As described above, the user access permissions 116 are stored in a labels store 118. In some examples, when an entity 132 has been associated with a label 122, the content tagging system 228 is operative to send a notification to the entity informing the entity of the association.

In some examples, tagging a document 114 with a label 122 operates as a signal to perform a particular action or sequence of actions. For example, the content tagging system 228 is operative to send a notification to entities 132 who are associated with the label 122 notifying the entities that a document 114 has been tagged. According to examples, the notification is an electronic notification, such as an email, a text message, an instant message, etc. The notification may include a link to the document 114 or to a virtual folder in which all documents tagged with the particular label 122 are logically grouped. According to an aspect, the documents 114 are not stored in the virtual folder. Rather, the virtual folder is analogous to a search folder that is populated with links to the documents 114 tagged with a referenced label 122, which has a low impact on disk space, and reduces duplication of saved documents.

Figure 3A:
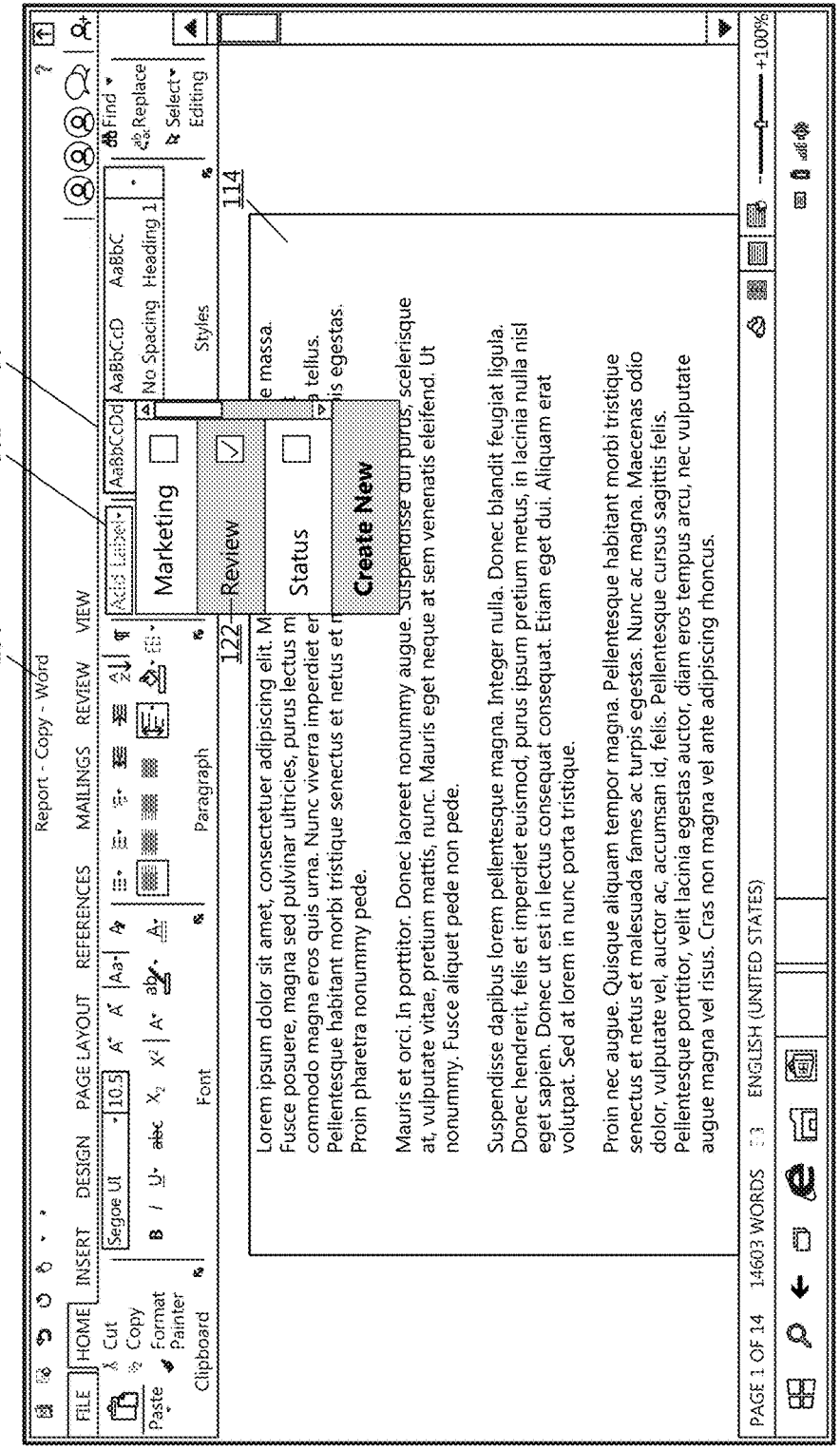
FIG. 3A is an illustration of an example user interface via which a user is enabled to tag a document with one or more labels.

With reference now to FIG. 3A, an example application user interface 300 via which a user 102 is enabled to tag a document 114 with one or more labels 122 is illustrated. According to an aspect, when viewing, authoring, or modifying a document 114, a user 102 or authorized entity 132 may select to add a label 122 to the document. In one example, a tagging user interface element 302 is provided for enabling the user 102 or a permitted entity to enter a label 122, to select an existing label to associate with the document 114, or to select to create a new label. Although illustrated as an element in an application user interface toolbar 304, the tagging user interface element 302 can be provided via various other methods and other methods for creating, entering, or selecting a label 122 are within the scope of the present disclosure. For example, the tagging user interface element 302 may be displayed in a pop-up menu in response to a right-click, a keyboard shortcut, or a spoken command.

According to an aspect, a listing of available, frequently-used, recently-used, or pinned labels 122 may be displayed in the tagging user interface element 302 from which the user 102 may select. According to another aspect, the user 102 may type, speak, or use other input methods to enter a label 122. In some examples, the listing of available, frequently-used, recently-used, or pinned labels are dynamically filtered as the user 102 inputs a name of a label 122. According to an aspect, when a new label 122 is entered, another user interface element is provided for enabling the user 102 to associate one or more entities 132 with the label.

In some examples, the user 102 is further enabled to select user access permissions 116 to assign to each associated entity.

Figure 3B:
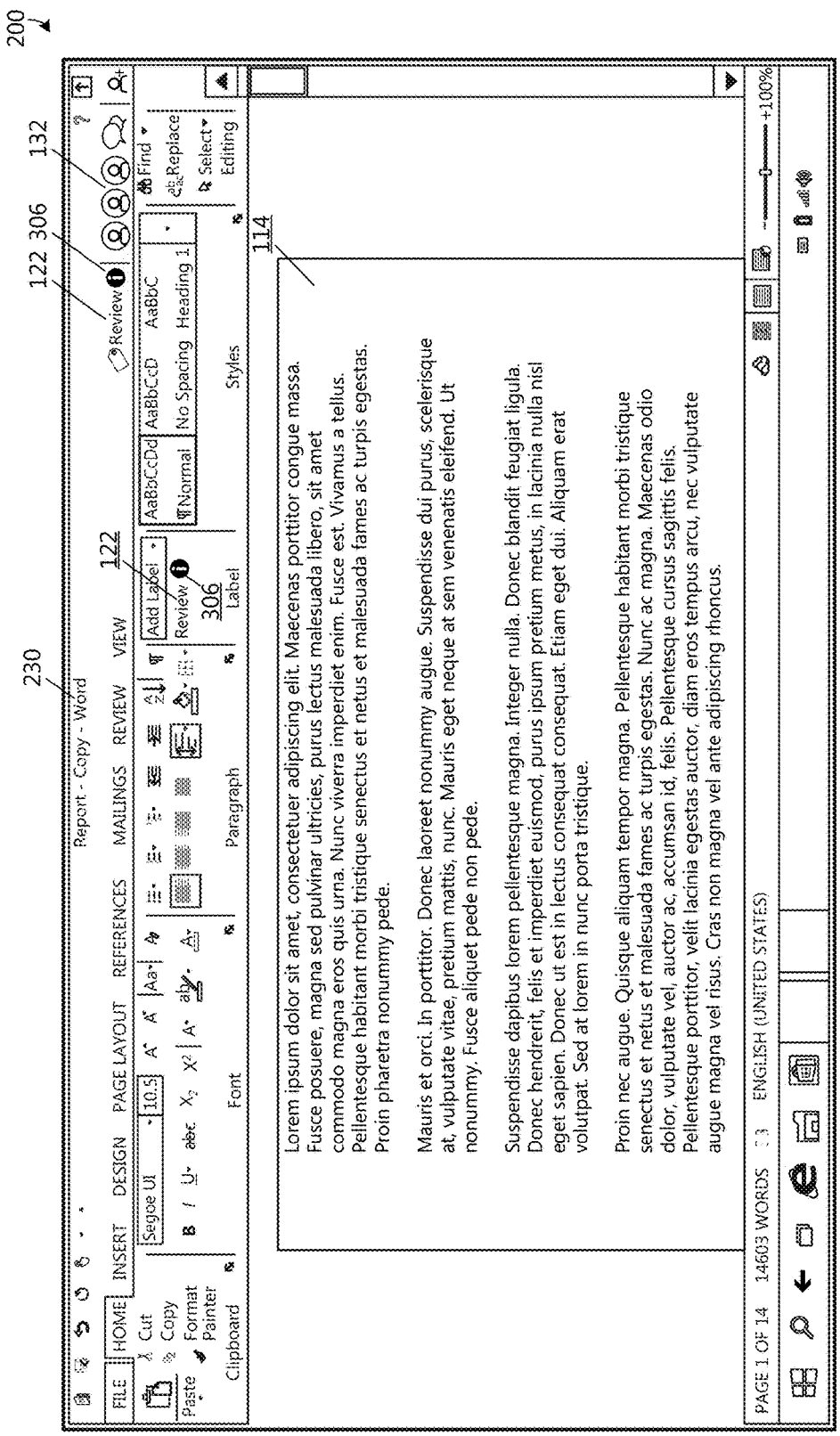
FIG. 3B is an illustration of an example user interface displaying labels associated with a document.

With reference now to FIG. 3B, the example application user interface 300 of FIG. 3A is shown updated with a display of labels 122 tagged to the document 114. For example, when a label 122 is selected or entered and accordingly associated with the document 114, the associated label is displayed. In some examples, additional information 306 may be selectively displayed, such as a list of entities 132 who are associated with the label 122, user access permissions 116 of the entities 132 who are associated with the label 122, the a list of other documents 114 that are tagged with the same label 122, etc.

Figure 3C:
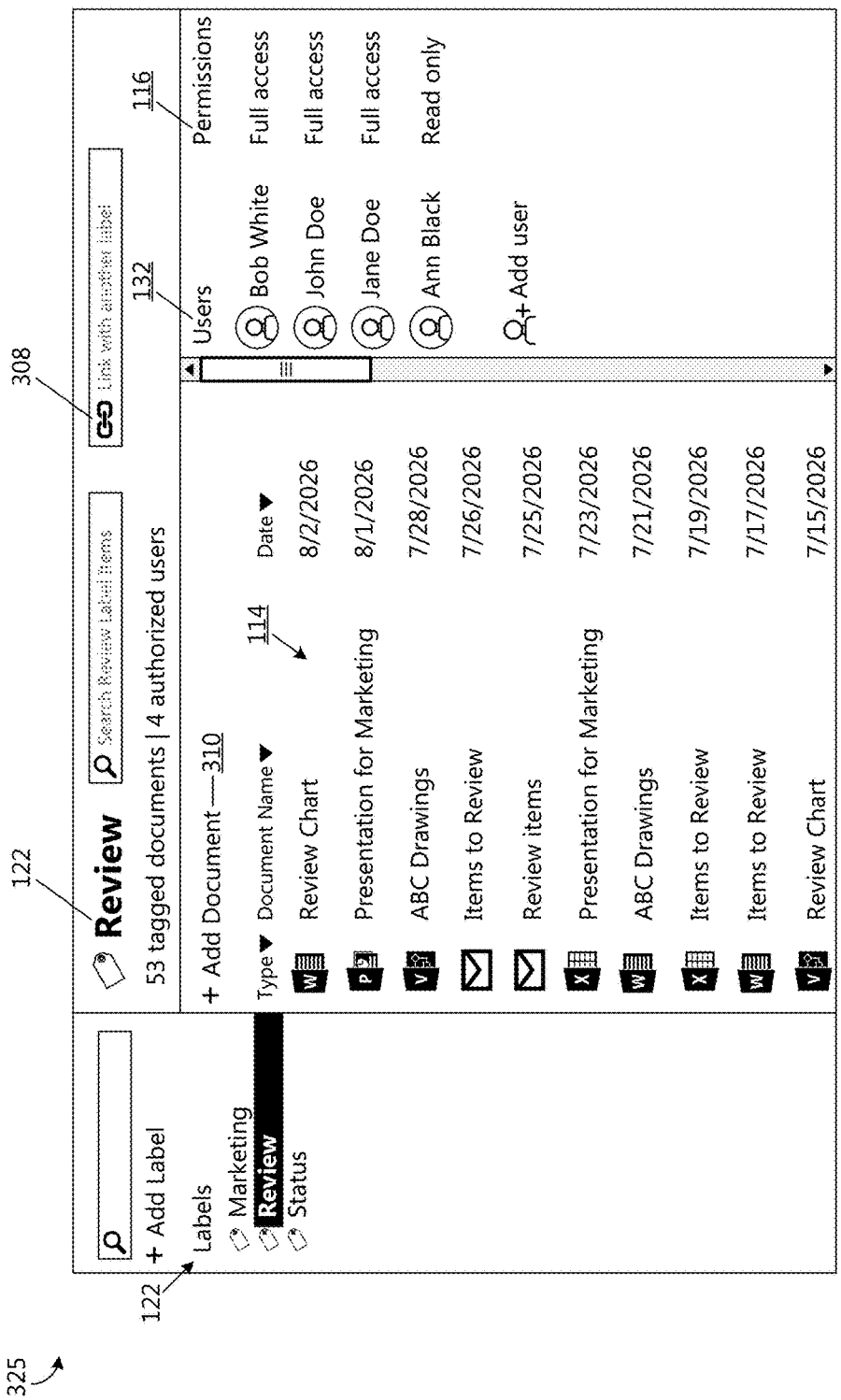
FIG. 3C is an illustration of an example user interface via which a user is enabled to manage labels.
Figure 4:
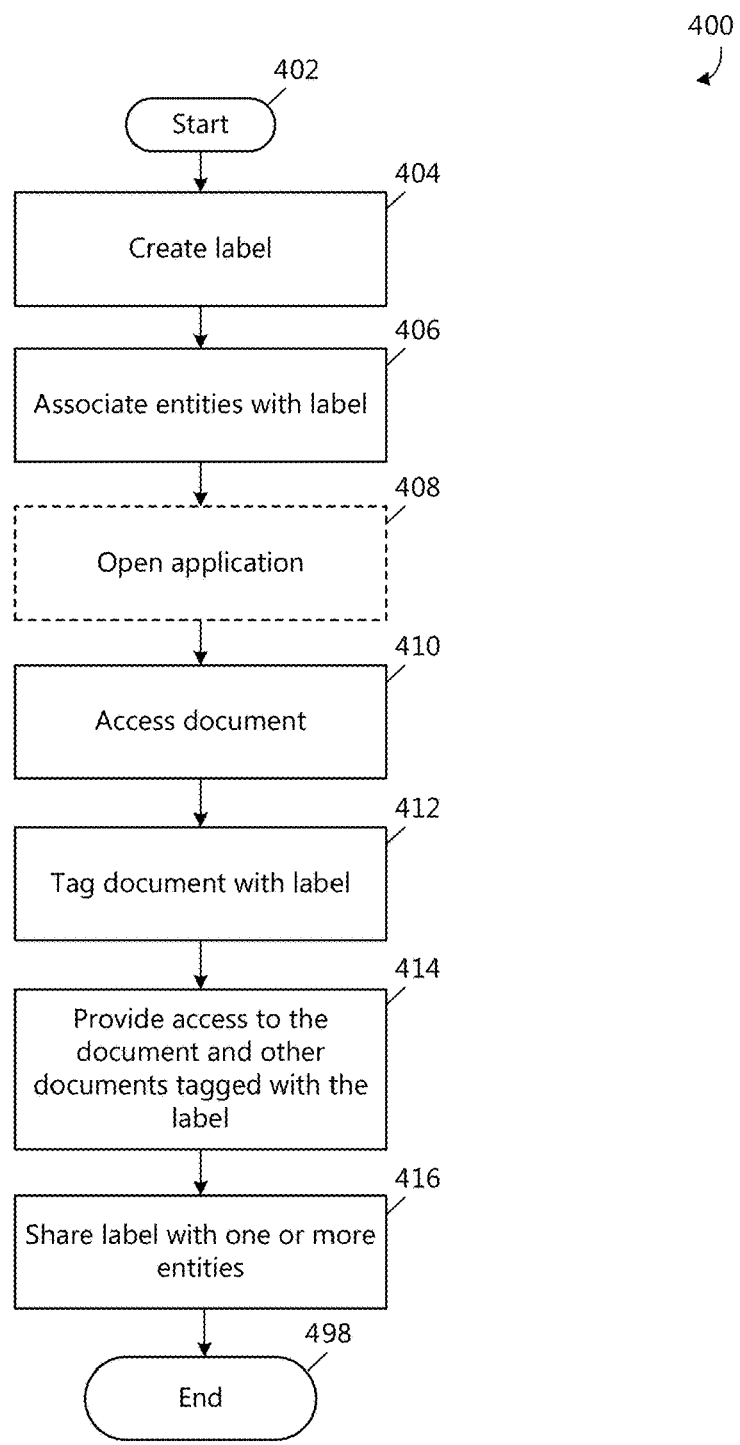
FIG. 4 is a flow chart showing general stages involved in an example method for providing efficient sharing of documents via logical tagging.

With reference now to FIG. 3C, an example user interface 325 for viewing or managing labels, entities, and user access permissions 116 is illustrated. For example, in the example user interface 325, various elements are provided for enabling the user 102 to perform various functions associated with a label 122, such as search for existing labels 122, add new labels, view documents 114 that are tagged with a selected label, view, add, or manage entities 132 who are associated with a label, view, add, or manage user access permissions 116 assigned to each entity, etc. According to an aspect, when a document is tagged with a label 122, metadata is attached to the document, which enables the document to be logically grouped with other documents that have been tagged with the same label. Accordingly, entities 132 who have been assigned user access permissions 116 to the label 122 are enabled to search for, view, and access documents that are tagged with a same label 122 in a single interface.

In some examples, a linking tool 308 is provided for enabling the user 102 to selectively link a label 122 with another label such when viewing a listing of documents 114 associated with a labels, documents associated with linked labels are also displayed in the listing. As described above and as illustrated in FIG. 3C, various types of resources can be tagged with a same label 122, such as productivity application documents, emails, drawings, video files, audio files, images, etc. In some examples, an add document functionality 310 is provided for enabling the user 102 to add a document 114 to the label 122, which is analogous to tagging a document with the label. For example, upon selection of the add document functionality 310, a user interface is displayed from which the user 102 can select one or more documents 114 to associate with the label 122. As should the appreciated, the example user interface displays illustrated in FIGS. 3A, 3B, and 3C are for purposes of illustration. Aspects may be implemented in many different forms and should not be construed as limited to the illustrated examples.

Having described an operating environment and various user interface display examples with respect to FIGS. 1-3C, FIG. 4 is a flow chart showing general stages involved in an example method 400 for providing efficient sharing of documents 114 via logical tagging. The method 400 starts at OPERATION 402, and proceeds to OPERATION 404, where a label 122 is created. For example, a user 102 may select to create a label 122 via a user interface, such as the example user interface illustrated in FIG. 3C. When creating a label 122, a label name is given to the label, which is an identifier that may include one or a combination of: a keyword, a term, numeric characters, alphabetic characters, separators, or special characters.

The method 400 proceeds to OPERATION 406, where one or more entities 132 are associated with the label 122. Further, user access permissions 116 are applied to the label 122. According to examples, the user access permissions 116 are user-configurable. When associating an entity 132 with a label 122, preset user access permissions 116 may be applied to the entity until they are configured by the user. In some examples, the same user access permissions 116 are applied to all entities 132 associated with the label 122. In other examples, user access permissions 116 are selected for each the entities 132 associated with the label 122. User access permissions 116 associated with a label 122 may allow or prevent entities 132 from certain activities associated with the label or associated with documents 114 tagged with the label. For example, user access permissions 116 may allow an entity 132 to or prevent an entity 132 from tagging documents 114 with the label. As another example, user access permissions 116 may allow an entity 132 to or prevent an entity 132 from editing documents 114 tagged with the label.

The method 400 proceeds to OPTIONAL OPERATION 408, where an application 230 is opened. For example, the application 230 may be one of various types of applications, such as a word processing application, a spreadsheet application, a database application, a slide presentation application, an electronic mail application, a drawing application, a note taking application, a web browser application, a media player application, an image viewing application, a game application, etc. According to one example, the application 230 is associated with the content tagging system 228 that provides a user interface 325 for enabling users to create and manage labels 122.

At OPERATION 410, a document 114 is accessed. For example, the document 114 may be opened in the application 230 or a new document 114 may be created using the application. In another example, such as when OPTIONAL OPERATION 408 is bypassed, a document 114 may be selected from a file or document viewer menu. In another example and as described above with reference to the example user interface 325 illustrated in FIG. 3C, the user 102 may select to add a document 114 to a selected label 122, and be presented with a user interface from which one or more documents may be selected.

The method 400 continues to OPERATION 412, where the accessed document 114 or documents are tagged with one or more labels 122. According to an aspect, tagging a document 114 with a label 122 attaches metadata to the document 114, wherein the metadata is utilized for grouping the document with other documents comprising the same metadata. For example, the user 102 may select an option to tag the document 114, such as via the example tagging user interface element 302 illustrated in FIG. 3A, and may be presented with a text box for entering a label 122 or a list of available, recently-used, or frequently-used labels from which the user may select. Upon selection or entry of a label 122, the content tagging system 228 tags the document 114 with the selected label. According to an aspect, the document 114 may be tagged with more than one label 122. As should be appreciated, in some examples, OPERATIONS 404-406 occur after OPERATION 412. For example, the user 102 may select to tag a document 114 with a new label 122 from within the application 230. Upon selecting an option to tag the document 114, such as via the example tagging user interface element 302 illustrated in FIG. 3A, the label 122 is created and one or more entities 132 may be selectively associated with the label.

The method 400 continues to OPERATION 414, where the one or more entities 132 associated with the one or more labels 122 are provided access to the document 114 and other documents tagged with the label. At OPERATION 416, the label 122 is shared with one or more entities 132. In some examples, a notification is provided to the one or more entities 132 notifying the entities that the document 114 has been shared with them. According to examples, the notification is an electronic notification, such as an email, a text message, an instant message, etc. The notification may include a link to the document 114 or to a virtual folder in which the document 114 and all documents tagged with the label 122 are logically grouped. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
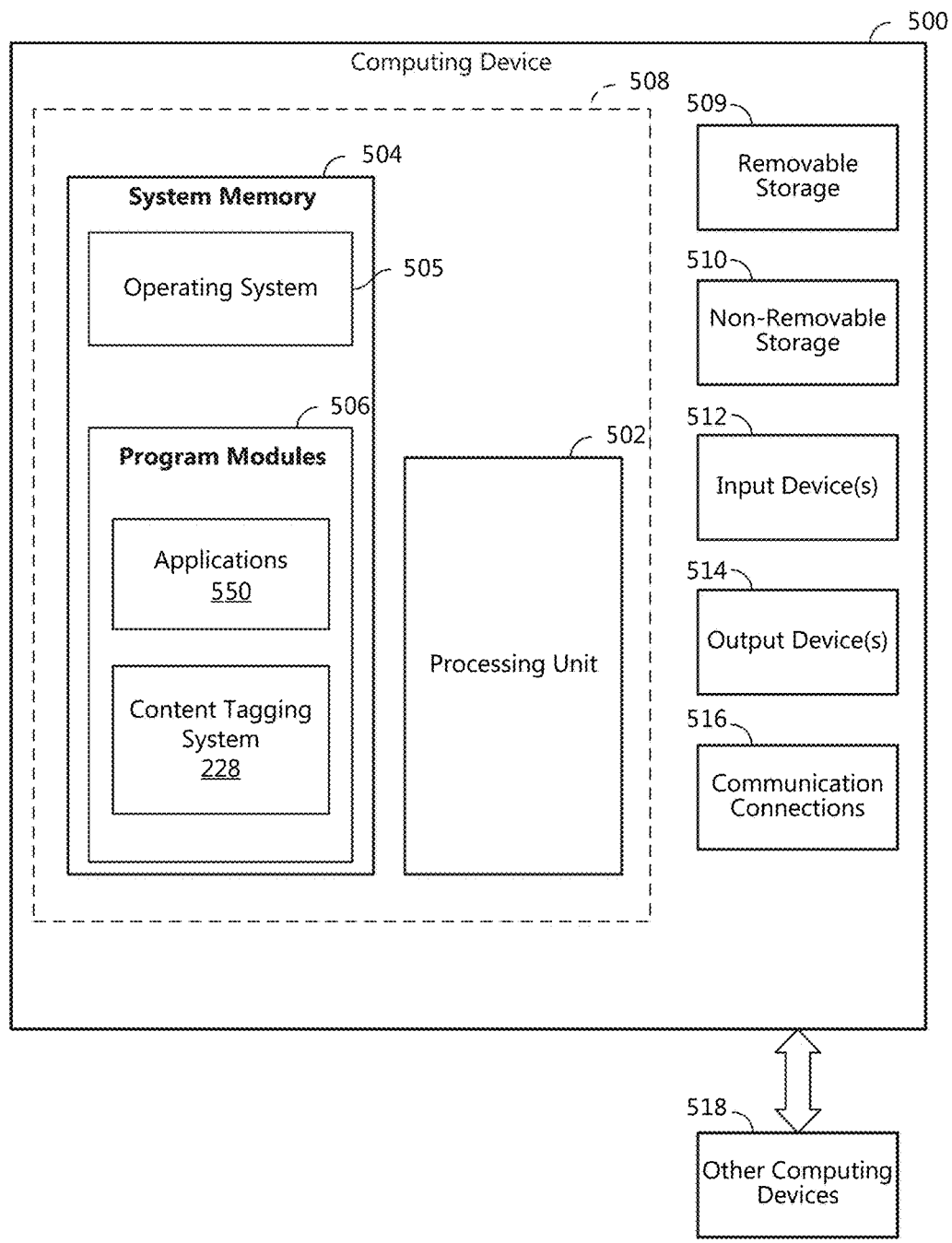
FIG. 5 is a block diagram illustrating example physical components of a computing device.
Figure 6A:
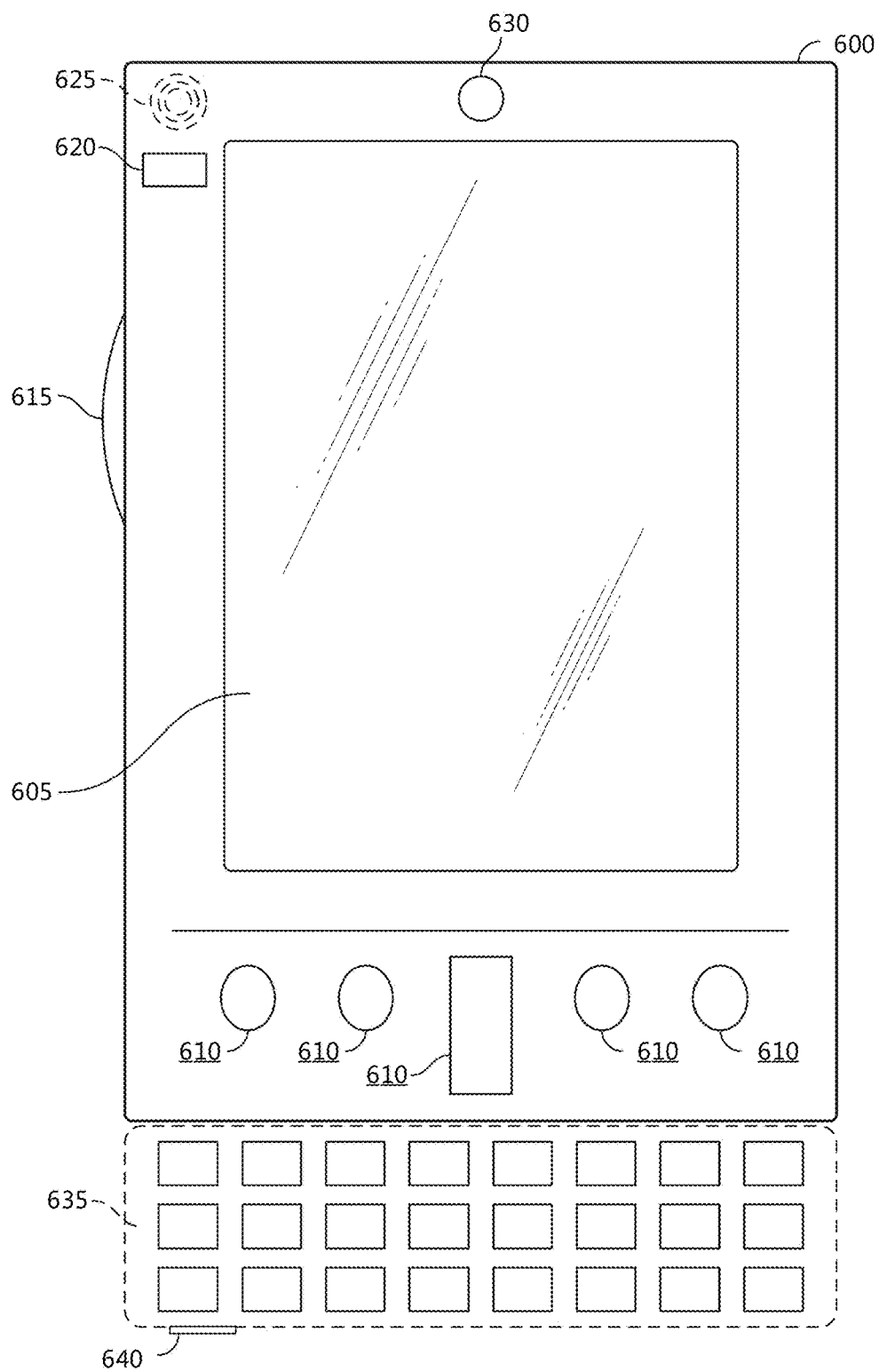
FIGS. 6A and 6B are block diagrams of a mobile computing device.
Figure 6B:
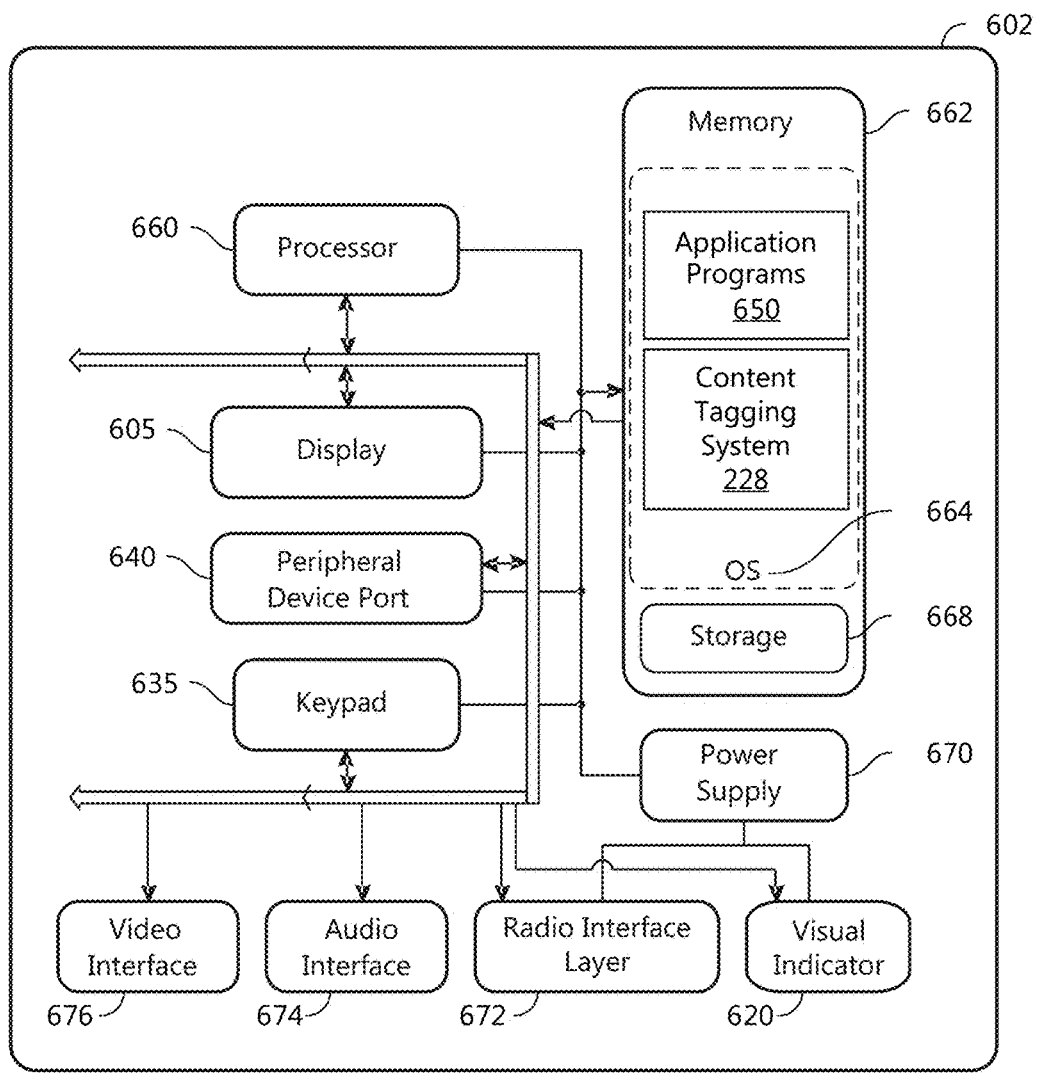
Figure 7:
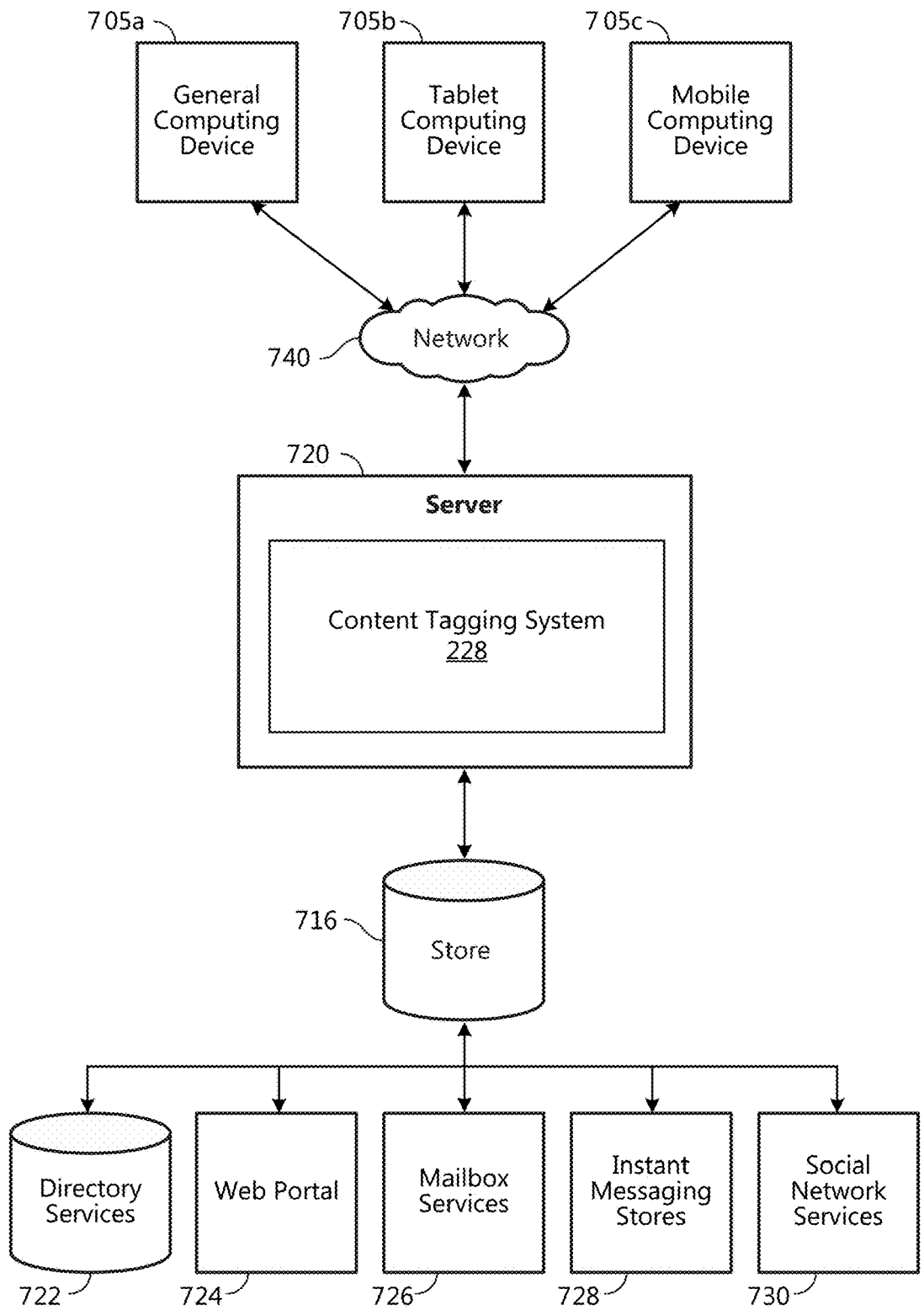
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the content tagging system 228. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., content tagging system 228) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the content tagging system 228 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing functionality for efficiently sharing documents 114 via logical tagging as described above. Content developed, interacted with, or edited in association with the content tagging system 228 is enabled to be stored in different communication channels or other storage types. For example, various documents may be stored using a directory service 722, a web portal 724, a mailbox service 726, an instant messaging store 728, or a social networking site 730. The content tagging system 228 is operative to use any of these types of systems or the like for providing efficient sharing of documents 114 via logical tagging, as described herein. According to an aspect, a server 720 provides the content tagging system 228 to clients 705a,b,c. As one example, the server 720 is a web server providing the content tagging system 228 over the web. The server 720 provides the content tagging system 228 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method for providing efficient sharing of documents via logical tagging, comprising:
associating one or more entities with a label;
accessing a document;
tagging the document with the label;
grouping the document with other documents tagged with the label in a virtual folder associated with the label; and
sharing the label with the one or more entities to provide the one or more entities access to the virtual folder, wherein the virtual folder provides a single user interface through which the one or more entities access, view, and search for the document and the other documents tagged with the label.

2. The method of claim 1, wherein tagging the document with the label comprises:
receiving input corresponding with the label within a tagging user interface element; and
applying the label as metadata to the document.

3. The method of claim 2, further comprising:
receiving an indication of a search for documents tagged with the label;
searching for documents comprising metadata associated with the label; and
displaying the documents comprising metadata associated with the label in the single user interface.

4. The method of claim 2, wherein receiving input corresponding with the label within the tagging user interface element comprises receiving input within the tagging user interface element displayed in a user interface of an application.

5. The method of claim 1, further comprising:
receiving a selection to create the label;
creating the label; and
receiving a selection of the one or more entities to associate with the label.

6. The method of claim 5, further comprising:
receiving a selection of user access permissions for the one or more entities; and
assigning the selected user access permissions to the one or more entities.

7. The method of claim 6, wherein assigning the selected user access permissions to the one or more entities comprises assigning an entity with permissions for tagging additional documents with the label.

8. The method of claim 1, further comprising providing a notification to an entity when the entity has been associated with the label, wherein the notification comprises a link to the virtual folder.

9. The method of claim 1, further comprising providing a notification to an entity when the document has been tagged with the label with which the entity is associated.

10. A system for providing efficient sharing of documents via logical tagging, the system comprising a computing device, the computing device comprising:
   a processing device; and
   a computer readable data storage device storing instructions that, when executed by the processing device, causes the computing device to:
      associate one or more entities with a label;
      access a document;
      tag the document with the label;
      grouping the document with other documents tagged with the label in a virtual folder associated with the label; and
      sharing the label with the one or more entities to provide the one or more entities access to the virtual folder, wherein virtual folder provides a single user interface through which the one or more entities access, view, and search for the document and the other documents tagged with the label.

11. The system of claim 10, wherein the system is further operative to:
   receive input corresponding with the label within a tagging user interface element; and
   apply the label as metadata to the document.

12. The system of claim 10, wherein the system is further operative to:
   receive an indication of a search for documents tagged with the label;
   search for documents comprising metadata associated with the label; and
   display the documents comprising metadata associated with the label in the single user interface.

13. The system of claim 10, wherein the system is operative to provide access to various types of documents stored across various repositories through the virtual folder.

14. The system of claim 10, wherein the system is further operative to:
   receive a selection to create the label;
   create the label; and
   receive a selection of the one or more entities to associate with the label.

15. The system of claim 14, wherein the system is further operative to:
   receive a selection of user access permissions for the one or more entities; and
   assign the selected user access permissions to the one or more entities.

16. The system of claim 15, wherein in assigning the selected user access permissions to the one or more entities, the system is operative to assign the one or more entities at least one of:
   viewing permissions for viewing the documents tagged with the label;
   editing permissions for editing the documents tagged with the label; and
   commenting permissions for inserting comments in the documents tagged with the label.

17. The system of claim 15, wherein in assigning the selected user access permissions to the one or more entities comprises assigning an entity with permissions for tagging additional documents with the label.

18. The system of claim 10, wherein the system is further operative to:
   provide a notification to an entity when the entity has been associated with the label; and
   provide a notification to an entity when a document has been tagged with a given label with which the entity is associated.

19. A computer readable storage device including computer readable instructions, which when executed by a processing unit is operative to:
   receive a selection to create a label;
   create the label;
   receive a selection of one or more entities to associate with the label;
   associate the one or more entities with the label;
   receive a selection of user access permissions for the one or more entities;
   assign the selected user access permissions to the one or more entities in association with the label;
   access a document;
   tag the document with the label;
   group the document with other documents tagged with the label in a virtual folder associated with the label; and
   share the label with the one or more entities to provide the one or more entities access to the virtual folder, wherein the virtual folder provides a single user interface through which the one or more entities access, view, and search for the document and the other documents tagged with the label.

20. The computer readable storage device of claim 19, wherein the computer readable storage device is further operative to:
   receive an indication of a search for documents tagged with the label;
   search for documents comprising metadata associated with the label; and
   display the documents comprising metadata associated with the label in the single user interface.

* * * * *